United States Patent [19]

Yamada et al.

[11] Patent Number: 5,143,763
[45] Date of Patent: Sep. 1, 1992

[54] OXYGEN SCAVENGER

[75] Inventors: Shinichi Yamada; Isamu Sakuma, both of Otsu; Yoshio Himeshima, Yokohama; Takao Aoki, Otsu; Tadahiro Uemura, Kyoto; Akira Shirakura, Tokyo, all of Japan

[73] Assignee: Toray Industries, Inc., Japan

[21] Appl. No.: 728,528

[22] Filed: Jul. 11, 1991

[30] Foreign Application Priority Data

Jul. 13, 1990 [JP] Japan ................... 2-186457

[51] Int. Cl.[5] .................... B65D 53/00; B65D 81/26
[52] U.S. Cl. .................... 428/36.2; 428/36.7; 428/36.91; 428/64; 428/218; 428/246; 428/252; 428/286; 428/287; 428/315.5; 428/315.7; 428/315.9; 428/447; 428/448; 428/482; 428/283; 428/36.5; 215/261; 215/228; 215/347; 215/348; 215/349; 215/350; 206/204; 206/484.1; 206/484.2
[58] Field of Search .............. 215/261, 232, 350, 347, 215/348, 349, 228; 220/258; 206/484.1, 204, 484.2; 252/188.28; 428/64, 66, 34.1, 34.6, 36.5, 36.91, 36.7, 36.2, 446, 447, 448, 482, 218, 246, 315.5, 315.7, 315.9, 252, 286, 287, 323, 402, 283

[56] References Cited

U.S. PATENT DOCUMENTS

| | | | |
|---|---|---|---|
| 3,521,784 | 11/1968 | Gaines | 215/261 |
| 3,816,233 | 6/1974 | Powers | 428/218 |
| 4,279,350 | 7/1981 | King | 215/261 |
| 4,287,995 | 9/1981 | Moriya | 215/228 |
| 4,421,235 | 12/1983 | Moriya . | |
| 4,733,786 | 3/1988 | Emslander | 215/232 |
| 4,756,436 | 7/1988 | Morita | 215/228 |
| 4,769,175 | 9/1988 | Inoue | 206/484.1 |
| 4,840,280 | 6/1989 | Schvester | 215/228 |
| 5,004,643 | 4/1991 | Caldwell | 428/447 |

FOREIGN PATENT DOCUMENTS

| | | |
|---|---|---|
| 305005 | 1/1989 | European Pat. Off. . |
| 56-2164 | 1/1981 | Japan . |
| 56-38056 | 4/1981 | Japan . |
| 57-194959 | 11/1982 | Japan . |
| 62-122569 | 6/1989 | Japan . |
| 1-308781 | 12/1989 | Japan . |
| 1-315438 | 12/1989 | Japan . |
| WO89/12119 | 2/1989 | PCT Int'l Appl. . |

OTHER PUBLICATIONS

"Composite Hollow Fiber Membranes for Gas Separation: The Resistance Model Approach", Jay M. S. Henis et al., Journal of Membrane Science, 8 (1981) 233-246.

Primary Examiner—Ellis P. Robinson
Assistant Examiner—Rena L. Dye
Attorney, Agent, or Firm—Austin R. Miller

[57] ABSTRACT

An oxygen scavenger comprises an oxygen absorbent composition and an oxygen permeable film covering the oxygen absorbent composition and including an asymmetric porous membrane whose outer surface portion in the thickness direction of the asymmetric porous membrane is formed as a dense skin layer. Since the dense skin layer is very thin, the oxygen permeability to the oxygen absorbent composition through the oxygen permeable film can be maintained sufficiently high. At the same time, since the dense skin layer has a sufficiently high barrier property as well as a high oxygen permeability, contact of the substances stored in a container with the oxygen absorbent composition can be surely prevented. The substances stored in the container attached with the oxygen scavenger can be prevented from deterioration due to the oxygen present in the container by a high oxygen absorption ability of the scavenger, and maintained in a good or fresh condition for a long term.

19 Claims, 2 Drawing Sheets

OXYGEN SCAVENGER

BACKGROUND OF THE INVENTION

1. Field of the Invention

The present invention relates to an oxygen scavenger for use in containers such as bottles and cans or closures thereof, and more particularly relates to an oxygen scavenger which is to be attached to containers or closures and which can increase the preservation stability of substances stored in containers by absorbing oxygen present in the containers, for example, for storage of beverages, liquids, seasonings, foods, chemicals and so forth (hereinafter, referred to as "beverages and so forth") such as a beer, sake, shochu (Japanese vodka), wine, vodka, juice, soy sauce, mirin (Japanese seasoning), miso, various sea foods and various chemicals which are deteriorated by oxygen and thereby changing their tastes or flavors or reducing their qualities.

2. Description of the Prior Art

In preservation of the beverages and so forth which are liable to be affected by oxidation, there is a problem that the beverages and so forth are oxidized by a small amount of oxygen present in a container used for storage and/or the beverages and so forth themselves and their tastes or flavors change during preservation in the container. To solve this problem, for example, vacuum packing, nitrogen replacement and use of oxygen absorbents are known as methods for removing oxygen present in containers. In particular, the following methods (A) and (B) are well known as methods for reducing the amount of oxygen present in a container used for charging beverages or liquids therein.

(A) gas replacement method (sealing method and non-sealing method) and preevacuation (single system and double system) for reducing the amount of oxygen present in a container before charging operation.

(B) foaming method (jet foamer method and supersonic wave method) and gas replacement method (capper method, seamer method and precapping method) for reducing the amount of oxygen present in the headspace of a container after the charging operation.

For example, in the beer industry, since oxygen oxidizes the components dissolved in beer and thereby reduces the flavor of the beer, it is said that the shorter is the period from the time of production to the time of drinking, the better is the taste of the beer. Therefore, proposed are the jet foamer method for injecting a small amount of pressurized water to foam the beer after charging the beer as a mechanical deoxygenation method and the oxygen absorption method due to ascorbic acid, glucose oxidase or yeast as a chemical deoxygenation method.

Alternatively, methods for attaching an oxygen absorbent to a cap of a beer container are also proposed. These methods can be classified into the following three groups in accordance with whether the oxygen absorbent is contained in a resin and/or whether the oxygen absorbent is fixed to a crown of the beer container via a barrier member to avoid the direct contact of the oxygen absorbent with the beer.

(1) The methods for containing an oxygen absorbent in a resin are disclosed in, for example, Japanese Patent Laid-Opens HEI-1-308781 and HEI-1-315438. The former publication discloses a method for fixing the mixture of a low density polyethylene, ascorbic acid and/or sodium sulfite, a lubricant (sodium dodecyl sulfate) and an antioxidant onto the back surface of a crown, thereby increasing the life of a beer. The latter publication discloses a method for attaching a polypropylene containing ascorbic acid to a crown, thereby increasing the preservation stability of a beer. Further, European Patent No. 305005 discloses that the sheet obtained by fixing a dried yeast in a slurry of molten paraffin, applying this slurry at a constant thickness and heat treating the applied slurry is effective to increase the preservation stability of a beer.

(2) The methods for fixing an oxygen absorbent are disclosed in, for example, Japanese Utility Model Laid-Opens SHO 55-161858 and SHO 56-38056 and U.S. Pat. Nos. 4,287,995, 4,421,235 and 4,756,436. These methods aim to prevent the contact of the stored substance with the oxygen absorbent by covering the oxygen absorbent with a sheet permeable to oxygen but impermeable to water and to perform an efficient oxygen absorption. For this sheet, a polyethylene, polypropylene or polyphloroethylene sheet having a pore size of 0.01 to 0.45 $\mu$m can be used. This sheet may be coated with a silicone resin or fluorocarbon in order to increase its water repellent property. The above publications propose iron, iron sulfate, iron chloride, dithionate, dithionite, ascorbic acid and its salt, catechol, hydroquinone, pyrogallol, Rongalit, copper-amine complex and so forth as oxygen absorbents. PCT WO89/12119 discloses a method wherein the oxygen absorbent insoluble to water made by applying metallic complex of polyalkylamine onto silica gel is fixed to the inside of a crown of a beer bottle or the inside of a beer can together with a gas permeable barrier member.

(3) Japanese Patent Laid-Open SHO 57-194959 discloses a method for attaching an oxygen absorbent to a crown, wherein the oxygen absorbent is contained in a resin and further a barrier member is provided. In this method, the oxygen absorbent is dispersed in an elastomer, and the mixture is fixed to the inside of the crown. A covering membrane composed of a polymer permeable to oxygen and water vapor but impermeable to water is provided on the oxygen absorber.

Other conventional methods or oxygen scavengers other than those described in the above (1), (2) and (3) are also known. Japanese Patent Laid-Open SHO 56-2164 discloses an oxygen scavenger wherein a composite wrapping material comprising two layers including a layer of a non-woven fabric and a layer having a permeability to gaseous oxygen but impermeable to water is used to the wrapping member for an oxygen absorbent. Japanese Patent Laid-Open HEI 1-167079 discloses an oxygen absorbable wrapping material holding an oxygen absorbent between an outer layer of poly-4-methylpentene and an inner layer of a resin capable of being easily heat sealed and having oxygen permeability. Japanese Patent Laid-Open SHO 62-122569 discloses a method wherein oxygen is concentrated into a limited space defined by a selective oxygen permeable membrane, and the concentrated oxygen is efficiently absorbed by an oxygen absorbent provided in another space.

In the above-described conventional technologies, however, there are the following problems.

A first problem is that it is difficult to screen an oxygen absorbent from the substance stored in a container while maintaining a sufficient oxygen permeability to the oxygen absorbent. The method for merely containing an oxygen absorbent in a resin cannot prevent the contact of the oxygen absorbent with the stored substance. To solve this problem, a method for fixing the oxygen absorbent via a barrier member is proposed. With this barrier member, a sheet (non-porous membrane), a porous membrane and a porous membrane applied with water repellent finishing are used. In the case of the sheet of the non-porous membrane, although a material having a high oxygen permeability is selected as the material for the sheet, the sheet requires a thickness greater than that of $\mu m$ order to ensure its mechanical properties. However, if the non-porous membrane having such a thickness is employed, its oxygen permeability is greatly reduced. On the other hand, in the case of the porous membrane, although the membrane has a high oxygen permeability because the membrane has pores with a pore size of generally greater than $\mu m$ order, it is difficult that the membrane completely screens the oxygen absorbent from the stored substance. Particularly in the system where the inside of a container is in a pressurized condition during preservation such as preservation of a beer or in the system where the substance is a liquid with low surface tension such as alcohlic beverages, this problem appears significantly. In order to solve this problem, a method for coating a water-repellent polymer on the porous membrane is proposed. In this coating method, however, arises another new problem that the coating polymer is impregnated into the pores of the porous membrane, thereby reducing its oxygen permeability. Namely, since it is difficult to make the non-porous barrier sheet thinner or control the pore size of the porous membrane to a fine size in these methods, an effective screening while maintaining a sufficient oxygen permeability cannot be achieved.

A second problem is that it is difficult to conserve an oxygen scavenger containing an oxygen absorbent for a long period of time. In many cases, oxygen scavengers are placed in the atmosphere from their production to their attachment. Therefore, the oxygen scavengers absorb the oxygen in the atmosphere during conservation. If an oxygen scavenger has already consumed most of its oxygen absorption ability at the time of attachment, the oxygen scavenger cannot be employed in practical use. In order to solve this problem, a method for giving a function to an oxygen absorbent to stop the oxygen absorption during conservation and to start the oxygen absorption after attachment by giving a certain stimulus to the oxygen absorbent is proposed. For example, PCT WO89/12119 discloses a method wherein polyalkylamine fixed to silica gel, which is an oxygen absorbent precursor, is mixed with a metallic salt, and as the result that the metallic salt is dissolved by the water component contained in the employed system and the dissolved metallic salt is taken into the polyalkylamine, the oxygen absorbent can exhibit its oxygen permeability. In this method, however, preparation of polyalkylamine fixed to silica gel is troublesome and the oxygen absorbent cannot exhibit a sufficient oxygen permeability under a low moisture condition.

As the methods other than those for attaching an oxygen scavenger or oxygen absorbent to a crown, Japanese Patent Laid-Opens SHO 56-2164 and HEI 1-167079 disclose a method for providing a resin layer impermeable to water directly on a non-woven fabric or a resin material having a good heat sealability and an oxygen permeability. In this method, however, it is difficult to form a homogeneous resin layer with no defect. The resin layer is required to be fairly thick in order to form a homogeneous resin layer with no defect, and therefore, it is impossible to obtain an oxygen scavenger having a high oxygen absorption rate. Japanese Patent Laid-Open SHO 62-122569 discloses a method for attaching a closure having an oxygen permeability to a sealable container in order to increase the preservation stability of a sauce for noodles. In this method, however, a space for storing the concentrated oxygen permeated through a selective oxygen permeable membrane and a space partitioned by a gas permeable supporting member for holding an oxygen absorbent therein are both necessary. Therefore, in this method, a high level production technology is required for the oxygen scavenger, and it is difficult to make the oxygen scavenger small and to obtain a sufficient oxygen permeability thereof. Moreover, although this method uses a polysiloxane-based selective oxygen permeable membrane produced by Monsanto Corporation (U.S. company) which is formed as a hollow fiber like oxygen permeable membrane wherein a non-porous membrane is formed on a porous layer (J. M. S. Henis, M. K. Toripodi, Journal of Membrane Science, 8, 233–246 (1981)), its oxygen permeability is poor and a sufficiently high oxygen absorption ability of the oxygen scavenger using such a membrane cannot be obtained.

SUMMARY OF THE INVENTION

Accordingly, an object of the present invention is to provide an oxygen scavenger which can maintain a high oxygen permeability to an oxygen absorbent composition while surely screening the oxygen absorbent composition from a substance stored in a container.

Another object of the present invention is to provide an oxygen scavenger which can exhibit a high oxygen permeability when it is actually used.

A further object of the present invention is to provide an oxygen scavenger suitable to attach it to the inner surface of a container or a closure, which can be made small-sized and easily produced.

To achieve these objects, an oxygen scavenger according to the present invention comprises an oxygen absorbent composition, and an oxygen permeable film covering the oxygen absorbent composition and including an asymmetric porous membrane whose outer surface portion in the thickness direction of the asymmetric porous membrane is formed as a dense skin layer.

In the oxygen scavenger according to the present invention, the oxygen permeable film is a necessary part for solving the aforementioned first problem, namely, enabling the film to screen the oxygen absorbent composition from a substance stored in a container while maintaining a sufficient oxygen permeability. The oxygen permeable film is constructed from an asymmetric porous membrane in order to accomplish this object. The asymmetric porous membrane in the present invention is defined as a plane membrane comprising a very thin dense skin layer forming one surface of the membrane and a porous layer supporting the dense skin layer. Since the dense skin layer has only very small pores necessary for permeation of oxygen such as ones having a pore size of angstrom level, the effect according to the dense skin layer for screening the oxygen absorbent composition from the stored substance is extremely high as compared with that according to the conventional porous membrane. Further, since the dense skin layer is very thin, the oxygen permeability of the dense skin layer and the oxygen permeability of the oxygen permeable film is extremely high as compared with that of the conventional sheet. Namely, the oxygen permeable film according to the present invention can achieve both a sufficiently high ability for screening the oxygen absorbent composition from the stored substance and a sufficiently high oxygen permeability to the oxygen absorbent composition. In a case where a sufficiently high screening ability may not be expected only by the layer of the asymmetric porous membrane such as a case where the pressure in a container is high, it is possible to increase the screening ability without reducing the oxygen permeability so much by further providing an oxygen permeable non-porous layer on the dense skin layer. Furthermore, the oxygen permeable film having the asymmetric porous membrane may be formed as a so called composite membrane which further comprises a support layer constructed from a woven fabric or a non-woven fabric for supporting the asymmetric porous membrane so as to be able to stand for a pressurized condition.

The oxygen absorbent composition in the oxygen scavenger according to the present invention is a necessary part for absorbing the oxygen present in a container and a substance stored in the container. It is desired for this oxygen absorbent composition to solve the aforementioned second problem, that is, to increase its conservation stability. For this, it is effective to contain an oxygen absorbent in a resin. Namely, if an oxygen absorbent is placed in the atmosphere as it is, the oxygen absorbent is activated by the moisture of a normal degree in the atmosphere and gradually deactivated in a certain period of time. Containing the oxygen absorbent into a resin is effective to prevent this trouble. A resin impermeable to moisture under a usual atmosphere condition and permeable to moisture and oxygen under a high moist condition can be used as the above resin. By using such a resin, the oxygen absorbent composition can exhibit its oxygen absorption function with the activation by the high moist atmosphere due to the stored substance when the oxygen scavenger is actually used in a container or a closure. Namely, the activation of the oxygen absorbent composition can be suppressed until attached to the container or closure, and the oxygen absorption ability thereof is exhibited substantially from the time when the oxygen scavenger is attached to or used in the container or closure. Thus, it becomes possible to achieve both a high conservation stability of the oxygen absorbent composition until the time when the oxygen scavenger is actually started to be used and a high oxygen permeability to the oxygen absorbent composition during the actual use of the oxygen scavenger in the container.

Moreover, since the oxygen scavenger according to the present invention may have at least the oxygen absorbent composition and the oxygen permeable film including the asymmetric porous membrane in order to achieve high oxygen permeability during the actual use and high conservation stability until the actual use, it can be formed in a simple structure. Therefore, it can be easily produced and easily made small-sized. Further, if the oxygen absorbent is contained in a resin, the conservation stability can be increased to a great extent, and the handling ability for production and attachment and the self-form maintaining ability can be also increased.

Furthermore, in the oxygen scavenger according to the present invention, a layer of a back side laminate may be provided on the surface of the oxygen absorbent composition opposite to the surface on which the oxygen permeable film is provided, in order to further increase the conservation stability of the oxygen absorbent composition and to make the attachment of the scavenger to the inner surface of a container or a closure easier. When the oxygen scavenger is attached to the inner surface of a container or a closure, the back side laminate is positioned between the oxygen absorbent composition of the scavenger and the inner surface of the container or the closure, and the scavenger can be easily, surely and effectively fixed to the container or the closure via the back side laminate. In addition, since the oxygen absorbent composition can be prevented from being exposed directly to the atmosphere during the conservation period by the presence of the back side laminate, decrease of the oxygen absorption ability of the oxygen absorbent composition can be prevented more surely.

In the oxygen scavenger according to the present invention, since the oxygen permeable film has a high oxygen permeation rate and the oxygen absorbent composition can maintain its oxygen absorption ability sufficiently high until actual use, the substance contained in the container applied with the scavenger can be maintained fresh and prevented from being deteriorated for a long term. The advantages due to the oxygen scavenger according to the present invention are remarkable particularly in use for the substances containing liquids such as water, oil and alcohol or the substances required to be preserved for a long term. The permeation of the contained substance to the oxygen absorbent composition can be surely prevented by the barrier of the oxygen permeable film, and the scavenger can be used for a very long period of time even in the use for liquids or the substances containing liquid. Further, since the permeation of the substances such as liquids to the oxygen absorbent composition can be prevented, there is not a fear that a nasty smell due to the reaction of the oxygen absorbent and the contained substances is generated. Furthermore, since the oxygen scavenger according to the present invention can be formed as a laminate comprising at least the oxygen absorbent composition and the oxygen permeable film having the asymmetric porous membrane, the production is easy. In addition, since the laminate formed as a sheet can be cut to a free size in accordance with the use, the scavenger can be easily made small-sized, and a special space for attachment is not necessary.

BRIEF DESCRIPTION OF THE DRAWINGS

Some preferred exemplary embodiments of the invention will now be described with reference to the accompanying drawings which are given by way of example only, and thus are not intended to limit the present invention.

DETAILED DESCRIPTION OF PREFERRED EMBODIMENTS OF THE INVENTION

Figure 1:
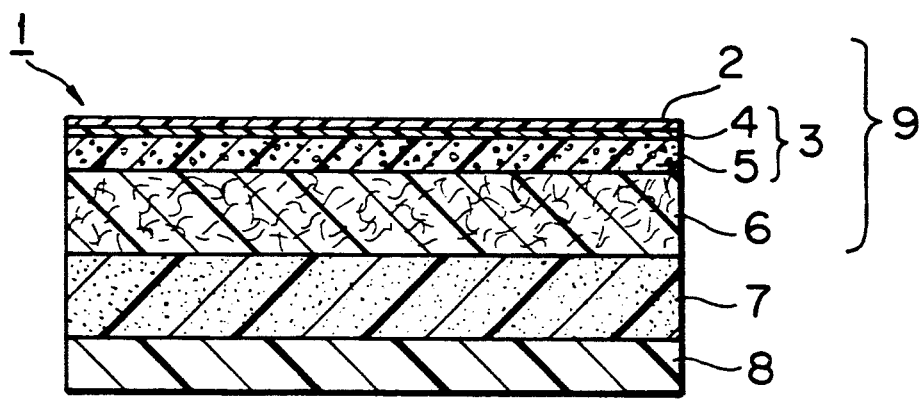
FIG. 1 is a sectional view of a lamination sheet used for making an oxygen scavenger according to an embodiment of the present invention.

Next, the present invention will be explained in more detail by embodiments and examples. However, the present invention is not restricted by the embodiments and examples.

(1) Asymmetric porous membrane:

The asymmetric porous membrane is defined as a planar membrane comprising a very thin dense skin layer forming one surface of the membrane and a porous layer supporting the dense skin layer. The dense skin layer present at one surface portion of the membrane is formed as a very thin layer having pores with a pore size of 0.0005 to 0.5 $\mu$m. Although the boundary between the dense skin layer and the porous layer is not so clear, a layer in which only the above very small pores exist is defined as the dense skin layer in the present invention. The thickness of this dense skin layer is preferably in the range of 0.01 to 1 $\mu$m. Since the dense skin layer is very thin and the porous layer adjacent to the dense skin layer has a high porosity, the gas or water vapor permeation rate of this asymmetric porous membrane is very high. The pore size of the dense skin layer is more preferably in the range of 0.001 to 0.1 $\mu$m, from the viewpoint of achieving both of desired screening ability and oxygen permeation rate, and in the case where the oxygen permeable non-porous membrane is provided on the dense skin layer, from the viewpoint of formation of a desired oxygen permeable non-porous membrane. The thickness of the entire asymmetric porous membrane is preferably in the range of 1 to 300 $\mu$m, more preferably in the range of 10 to 100 $\mu$m, in order to obtain a practical mechanical strength and a sufficiently high oxygen permeation rate.

In the present invention, the asymmetric porous structure is required to stand both of desired screening ability and oxygen permeation rate, and in particular, the gas permeation resistance of the membrane can be suppressed by the asymmetric porous structure. Namely, although the screening ability of the dense skin layer is very high because the pore size of the dense skin layer is very small, the oxygen permeation ability of the dense skin layer is not reduced because the layer is extremely thin. On the other hand, since the porous layer has a relatively large pore size and a large porosity, its oxygen permeation ability is extremely high. Therefore, high screening ability and high oxygen permeation rate are both achieved with the whole asymmetric porous membrane. The mechanical strength of the asymmetric porous membrane can be ensured by the porous layer. Although the porosity of the entire asymmetric porous membrane can be determined freely in accordance with its use, generally it is selected from the range of 10 to 90%. If the porosity is high, the oxygen permeation rate of the membrane is high, and if the porosity is low, the durability of the membrane is high. In the present invention, in order to achieve these properties with a good balance, the porosity is preferably in the range of 70 to 85%. The gas permeability of the asymmetric porous membrane is preferably in the range of 10 to 10,000 ($m^3/m^2 \cdot hr \cdot atm$) by air permeation rate.

The asymmetric porous membrane can be made by the methods known as those for producing an ultrafiltration membrane and so forth, for example, phase inversion process, melting process and stretching process. Among these methods, the typical and preferable example is a phase inversion process. The preparation of the asymmetric porous membrane by the phase inversion process consists of three consecutive steps:

1. A polymer is dissolved in an appropriate solvent to form a solution containing 10 to 30 wt % polymer.
2. The solution is cast into a film of typically 100 to 500 $\mu$m thickness.
3. The film is quenched in a nonsolvent which for most polymers is typically water or an aqueous solution.

During the quenching process, the homogeneous polymer solution is precipitated into two phases: a polymer-rich solid phase, which forms the membrane structure, and a solvent-rich phase, which forms the liquid-filled membrane pores. Generally, the pores at the film surface where precipitation occurs first and most rapidly are much smaller than those in the interior or the bottom side of the film, and this leads to the asymmetric structure. As the materials forming the asymmetric porous membrane, aromatic polysulfone-based materials such as polysulfone, polyethersulfone, polyphenylenesulfidesulfone and polyphenylenesulfone, cellulose-based materials such as cellulose acetate, ethyl cellulose and cellulose, polyolefin based materials such as polyacrylonitrile, polypropylene and polyethylene, fluorine-containing polymer materials such as polyvinylidene fluoride and polytetrafluoroethylene, polyamide-based materials, polyimide-based materials and polyurethane-based materials can be used. Among these materials, aromatic polysulfone-based materials are preferably used from the viewpoints of their high gas permeability and easy control to desired pore sizes.

(2) Support layer constructed from woven fabric or non-woven fabric:

A layer constructed from a woven fabric or a non-woven fabric may be provided as a layer for supporting the asymmetric porous membrane. If such is the case, the oxygen permeable film comprising the asymmetric porous membrane and the support layer is formed as a so-called composite membrane. Although the oxygen permeable film can be constructed from only the asymmetric porous membrane in the present invention, it is preferable to provide the support layer in order to give the oxygen permeable film a more desirable mechanical strength. The support layer constructed from a woven fabric or a non-woven fabric preferably has a sufficiently high gas permeability and a good mechanical strength. As a material for such a support layer, a known woven fabric or non-woven fabric whose main component is of a polyolefin such as polypropylene and polyethylene, a polyester such as polyethylene terephthalate, a polyamide such as nylon, or a natural fiber can be used. The gas permeability of the support layer is not particularly restricted unless the oxygen permeated through the asymmetric porous membrane receives a great resistance before reaching the oxygen absorbent composition. For example, the gas permeability of the support layer can be selected from the range of 0.01 to 100 ($ml/cm^2 \cdot sec$). The gas permeability of the support layer is preferably in the range of 0.1 to 10 ($ml/cm^2 \cdot sec$) in consideration of the membrane formation ability of the asymmetric porous membrane and the ability of the oxygen permeable film having the composite structure when the asymmetric porous membrane is formed on the support layer. The thickness of the support layer is preferably in the range of 50 to 300 $\mu$m from the viewpoint of the supporting strength. In the case of non-woven fabric, the weight of the non-woven fabric corresponding to the value satisfying the above properties is in the range of 10 to 200 $g/m^2$. If a material having a heat sealable property is used as the woven fabric or the non-woven fabric, the working efficiency when the back side laminate is provided can be improved.

(3) Oxygen permeable non-porous layer:

An oxygen permeable non-porous layer may be further provided on the dense skin layer of the asymmetric porous membrane in the present invention. The oxygen permeable non-porous layer is a layer which can prevent the permeation of the contained substance such as water and oil more surely, and which has a permeability to oxygen and water vapor. When the oxygen permeability of the oxygen permeable non-porous layer is expressed by oxygen permeability coefficient "$P_{O_2}$" (volume of permeated oxygen·thickness of membrane/area of membrane·time ·pressure), "$P_{O_2}$" is preferably higher than $1 \times 10^{-10}$ ($cm^3 \cdot cm/cm^2 \cdot sec \cdot cmHg$), more preferably higher than $1 \times 10^{-9}$ ($cm^3 \cdot cm/cm^2 \cdot sec \cdot cmHg$). Although the water vapor permeability of the oxygen permeable non-porous layer cannot be determined by itself because it depends upon the temperature and pressure in the container and the characteristics of the contained substance and the oxygen absorbent, a preferable value thereof can be roughly determined, for example, to be higher than 0.5 ($g/m^2 \cdot atm \cdot 24hr$).

As a polymer satisfying such ranges for the oxygen permeable non-porous layer, for example, a polyorganosiloxane such as polydimethylsiloxane, polymethylphenylsiloxane or crosslinked polysiloxane derivatives, a polyorganosiloxane copolymer such as polyorganosiloxane/polystyrene copolymer, polyorganosiloxane/polycarbonate copolymer or polyorganosiloxane/polysulfone copolymer, a polyolefin such as poly(4-methylpentene-1), polyethylene/propylene copolymer, crosslinked polymer of poly(4-methylpentene-1) or poly(di-tert-butylfumarate), a polyphenyleneoxide such as poly(2,6-dimethyl-1, 4-phenyleneoxide) or silyl-modified-poly(2,6-dimethyl-1,4-phenyleneoxide), an acetylene substitutional polymer such as poly(trimethylsilylpropyne) or poly(tert-butylacetylene), a cellulose such as ethylcellulose, or a polyorganophosphazene such as poly(bisethoxyphosphazene) can be used.

Crosslinked polymer of polyorganosiloxane or poly(4-methylpentene-1) is preferable to form a pinhole free oxygen permeable non-porous layer realizing a high oxygen permeability. As a modified polyorganosiloxane capable of crosslinking, there are silanol modified polyorganosiloxanes shown by the following chemical formulas.

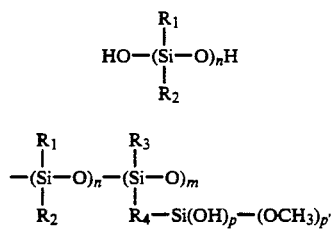

In the above chemical formulas, $R_1$ and $R_2$ are groups selected from methyl group, ethyl group, propyl group or phenyl group. $R_3$ is a group selected from methyl group, ethyl group or propyl group. $R_4$ is an alkyl group having the number of carbon of 2 to 15 or the compound shown by the following chemical formula. "p" is an integer of 1 to 3, and $p+p'=3$. "n+m" is an integer of 50 to 3,000, and $0.001 \leq m/(m+n) \leq 0.20$.

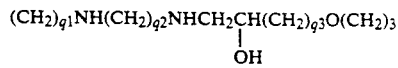

In the above chemical formula, $q_1$, $q_2$ and $q_3$ are integers selected from 2 to 10.

The above-described compounds can be crosslinked by the crosslinking agent of silane which has a high reactivity with the silanol group of the compounds such as polyfunctional acetoxy-based silane, oxime-based silane, alkoxy-based silane, alkenyloxy-based silane, amide-based silane and amino-based silane, or by the crosslinking agent of siloxane which is the hydrolysis compound of the cross linking agent of silane. Although the number of the functional groups is not particularly restricted, a functional group more than tetrafunctional group is preferable from the viewpoints of the reactivity, the property for forming a thin layer on the asymmetric porous membrane and the strength of the thin layer. The preferable compounds are, for example, tetraacetoxysilane, tetradimethyloximesilane, ethylorthosilicate, propylorthosilicate, tetraxyisopropenyxysilane, ethylpolysilicate, pentadimethyloximesiloxane, hexadimethyloximesiloxane and hexaacetoxysiloxane. In this reaction, a catalyst may be employed to increase the reaction speed. Dibutyl-tin-acetate or dibutyl-tin-octoate can be used as such a catalyst.

There are the amino-modified polydimethylsiloxanes shown by the following chemical formulas as the examples of polydimethylsiloxane derivatives aforementioned.

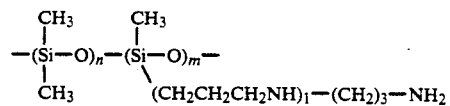

In the above chemical formula, "n+m" is an integer of 50 to 3,000, and "l" is an integer of 0 to 5.

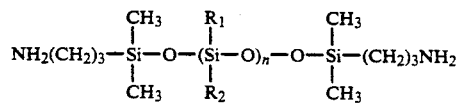

In the above chemical formula, $R_1$ and $R_2$, are groups selected from methyl group, ethyl group, propyl group or phenyl group. "n" is an integer of 50 to 3,000.

These compounds can be made to polydimethylsiloxane derivatives by using polyfunctional compounds having two or more functional groups in each of their molecules, such as acid chloride, acid anhydride, isocyanate, thioisocyanate, sulfonylchloride, epoxy, aldehyde and activated halogen. Particularly, acid chloride, isocyanate compound and aldehyde compound are preferable because of their high reactivities. As more concrete compounds, for example, isophthalic acid dichloride, tolylene-2,4-diisocyanate, diphenylmethane-4,4'-diisocyanate, glutaraldehyde and phthalaldehyde can be proposed.

As the crosslinked polymer of poly(4-methylpentene-1), the self-crosslinked polymer of trimethoxyvinylsilane graft poly(4-methylpentene-1) can be used.

Although many compounds are described in the above as a material for forming the oxygen permeable non-porous layer, the compound is not particularly restricted as long as the oxygen permeability coefficient substantially can satisfy the range aforementioned. Further, another polymer may be added to the polymer forming the oxygen permeable non-porous layer, as long as the oxygen permeability of the oxygen permeable non-porous layer is not damaged. Therefore, it is possible to form the oxygen permeable non-porous layer by mixing method or lamination method, using two or more polymers above-described.

As the method for forming the oxygen permeable non-porous layer, any of polymer coating method, interfacial polymerization of monomer, method for crosslinking a crosslinkable polymer after coating, and plasma polymerization, or other methods can be employed. With respect to the thickness of the oxygen permeable non-porous layer, if the layer is too thin, the mechanical strength thereof decreases. To the contrary, if the layer is too thick, the oxygen permeation rate thereof decreases. Therefore, the thickness is preferably in the range of 0.01 to 3μm, more preferably in the range of 0.05 to 1 μm.

(4) Oxygen permeable film:

The oxygen permeable film is formed by the asymmetric porous membrane, or the asymmetric porous membrane and the support layer constructed from a woven fabric or a non-woven fabric, or the asymmetric porous membrane, the support layer and the oxygen permeable non-porous layer, in the present invention. The oxygen permeable film may be formed as a so called composite membrane. The oxygen permeation rate "$Q_{O2}$" of the oxygen permeable film is preferably in the range of 0.1 to 50 ($m^3/m^2 \cdot hr \cdot atm$), more preferably in the range of 0.5 to 15 ($m^3/m^2 \cdot hr \cdot atm$). If the oxygen permeation rate is lower than the above range, the oxygen absorption rate of the oxygen scavenger is reduced. If the oxygen permeation rate is higher than the above range, the oxygen permeable film is liable to be injured by, for example, the contact with other substances. Therefore, a rate out of the above range is not desirable. The permeability to water vapor of the oxygen permeable film is preferably higher than 1.0 ($g/m^2 \cdot atm \cdot 24hr$) in order to activate the oxygen absorbent. Particularly in the case where the contained substance is a food or a beverage easily oxidized, the water vapor permeability is preferably higher than 10 ($g/m^2 \cdot atm \cdot 24hr$), more preferably higher than 40 ($g/m^2 \cdot atm \cdot 24hr$).

In the oxygen permeable film having an oxygen permeable non-porous layer, the oxygen permeable non-porous layer is preferably a pinholeless and homogeneous layer. The homogeneity of the oxygen permeable non-porous layer can be expressed by using an index of the ratio of oxygen/nitrogen permeation rates "$\alpha$" ($=Q_{O2}/Q_{N2}$). When the specific ratio of oxygen/nitrogen permeation rates of the material forming the oxygen permeable non-porous layer is represented as "$\alpha$", the "$\alpha$" of the oxygen permeable film is preferably in the range of $0.5\alpha^*$ to $2.0\alpha^*$, more preferably in the range of $0.8\alpha^*$ to $1.5\alpha^*$. If the "$\alpha$" of the oxygen permeable film is lower than the above range, pinholes exist in the oxygen permeable non-porous layer, and this is not desirable. If the "$\alpha$" of the oxygen permeable film is higher than the above range, the oxygen permeable non-porous layer is impregnated into the asymmetric porous membrane. Since the oxygen permeation rate of the oxygen permeable film is reduced by the impregnation, this state also is not desirable.

(5) Resin containing oxygen absorbent therein:

In the present invention, the oxygen absorbent composition is preferably formed as a composition made by containing an oxygen absorbent in a resin impermeable to moisture under a usual atmosphere condition but permeable to moisture and oxygen under a high-moisture condition, in order to prevent the deactivation of the oxygen absorbent until the oxygen scavenger is actually attached and used and thereby increase the conservation stability of the oxygen scavenger. As such a resin, for example, polyethylene, polypropylene, ethylene-vinyl acetate copolymer, or vinyl chloride-based, isoprene-based, butadiene-based, chloroprene-based, urethane-based or acryl-based copolymer can be used. The most preferable resin is a silicone resin from the viewpoints of oxygen permeability and water vapor permeability. Although the resin is preferably as dense as possible in consideration of holding the oxygen absorbent, the resin may be formed in a porous structure for the purpose of elevating the oxygen and/or water vapor permeability to increase the oxygen absorption ability of the oxygen scavenger. The layer of the oxygen absorbent composition comprising the oxygen absorbent and the resin can be formed, for example, by a method for mixing a silicone compound and the oxygen absorbent, applying the mixture at a constant thickness and thereafter curing the applied layer. Although the application method is not particularly restricted, the mixture is applied in a form suitable to the use of the oxygen absorbent composition by, for example, screen printing. In the case of producing an oxygen absorbable disc to be attached to a crown, a method for applying the mixture on a sheet in a form of "polka dots" (circular shape) is efficient for the production. As the shape of the application, various shapes in accordance with the use, such as an oval, a triangle, a rectangle and a hexagon, or even amorphous state can be employed. Although it is difficult to specify the thickness of the application within a particular range because the required amount of the oxygen absorbent depends on the volume of the oxygen enclosed in a container, the thickness is preferably in the range of 5 μm to 3 mm from the viewpoints of the adhesive ability to the back side laminate and sealability of the oxygen absorbent composition layer. To make the application easier, the mixture of the compound and the oxygen absorbent may be diluted with a solvent. Although this solvent is not particularly restricted, a solvent with a low boiling point and a volatile property is preferably used because the shape after application can be easily maintained by using such a solvent. Although the ratio of the resin and the oxygen absorbent also is not particularly restricted, the ratio of oxygen absorbent/resin is preferably in the range of 0.2 to 2.0 Particularly in consideration of the oxygen absorption ability and the ability for holding the oxygen absorbent, the range of 0.7 to 1.3 is more preferable.

(6) Oxygen absorbent:

As the oxygen absorbent used in the present invention, a conventional oxygen absorbent can be used as it is. For example, one kind of or two or more kinds of absorbents selected from the group consisting of organic oxygen absorbents such as ascorbic acid, ascorbic acid salt, isoascorbic acid, isoascorbic acid salt, gallic acid, gallic acid salt, tocopherol, hydroquinone, catechol, resorcine, dibutylhydroxytoluene, dibutylhydroxyanisole, pyrogallol, Rongalit, sorbose, glucose and lignine, iron-based oxygen absorbents such as iron powder, activated iron, ferrous oxide and iron salt, inorganic oxygen absorbents such as sulfite, thiosulfate, dithionite and hydrogensulfite, polymer oxygen absorbents such as oxidation-reduction resin and polymer metallic complex, and oxygen absorbents such as zeolite and activated carbon can be employed in accordance with the service conditions. In the case of powdery oxygen absorbent, although the particle size is not particularly restricted, generally it is desirable to be smaller for the purpose of enlarging the total surface area of the powder. The oxygen absorbent may contain other substances such as catalyst, water retentive agent and hydrate in order to control the oxygen absorption ability. The oxygen absorbent preferably does not exhibit its oxygen absorption ability under a usual atmosphere condition (room temperature, not higher than 70% by relative humidity) and exhibits its oxygen absorption ability under a condition near dew point in order to make the production and conservation thereof easier. However, the oxygen absorbent is not particularly restricted to such one.

(7) Back side laminate:

The back side laminate mainly has two functions of enabling the oxygen scavenger to easily and surely adhere to the inner surface of a container or a closure and of suppressing the decrease of the oxygen absorption ability of the oxygen absorbent composition (deactivation) during conservation. With respect to the former function of adhesion, the back side laminate must have an adhesive ability enough to strongly bond or integrate the inner surface of a container or a closure and the layer of the oxygen absorbent composition. The bonding method for bonding the back side laminate to the oxygen absorbent composition or the inner surface of a container or a closure may be any method for using an adhesive or by heating or utilizing supersonic waves. In the uses of beverages and foods, however, the method by heating or utilizing supersonic waves is preferable because dissolution substances are little. With respect to the latter function of oxygen barrier property, a commonly used oxygen barrier film can be employed as the material for the back side laminate. As such an oxygen barrier film, polyvinylidene chloride coated KOP (trademark; K coated polypropylene)/-polyethylene film, KON (trademark; K-coated nylon)-/polyethylene film, KPET (trademark; K-coated polyester)/polyethylene film, Eval (trademark; film), Saranex (trademark; film), OV (trademark; film), Barrieron (trademark; film) or aluminium foil/polyethylene, whose oxygen permeation rate at a temperature of 20°-25° C. is not greater than 1.0 (ml/m$^2$·hr·atm), can be employed. However, in the case where the oxygen absorbent is not activated under a low moisture condition or the term from production to attachment is short, the above condition of oxygen permeation rate is not always required. Although the oxygen permeation rate is not particularly restricted as long as it is lower than 4,000 (ml/m$^2$·hr·atm), the oxygen permeation rate is preferably not greater than 125 (ml/m$^2$·hr·atm) in the case where a so-called quick-type oxygen absorbent is used. The thickness of the back side laminate is preferably not greater than 800 μm from the viewpoint of adhesive property to the oxygen absorbent composition, and preferably not less than 50 μm from the viewpoint of mechanical strength. Further, in consideration of the oxygen barrier property, the adhesive property and productivity, the thickness is more preferably in the range of 200 to 500 μm.

(8) Container or Closure:

The above-mentioned oxygen scavenger according to the present invention can be used by attaching or fixing to the inner surface of a container or a closure. Although the kind of a container or a closure used in the present invention is not particularly restricted, rigid containers such as metal, glass or plastic bins, bottles, cans, drums or boxes, or bags can be employed as the containers, and metal or plastic caps such as crowns, twist-off caps, screw caps, pilfer-proof caps, lug caps, tear-off caps or ring-pull caps can be employed as the closures.

The oxygen scavenger according to the present invention can be fixed to the inner surface of a container or a closure by cutting or punching the sheet obtained in the aforementioned manner to a shape corresponding to that of the attachment portion of the container or the closure, and thereafter, attaching and fixing the cut or punched sheet to the attachment portion by the aforementioned adhesion or bonding method. The oxygen scavenger can be processed to any shape in accordance with the shape of the container or the closure. For example, the oxygen scavenger is punched to form a circular disc in the case of a closure such as a crown. Since the size of the disc affects the absorbable amount of oxygen, the size may be determined in accordance with the amount of oxygen required to be absorbed. Generally, the inner diameter of the crown for a beer bottle is about 2.5 cm. Therefore, the preferable size of the oxygen scavenger attached to the crown for a beer bottle is in the range of 0.8 to 1.8 cm by diameter, in consideration of the space for a liner provided in the crown and the amount of oxygen to be absorbed. The material of the liner provided in a closure such as a crown is not particularly restricted as long as it has a good elasticity and it does not exhibit undesired sanitary property. Preferable materials for the liner are, for example, cork (compressed cork, compressed cork plus aluminium), polyolefin (polyethylene, ethylene vinyl acetate copolymer, polypropylene), inner seal (paper board plus aluminium foil), fluid polyvinylchloride (polyvinylchloride plus plasticizer plus foaming agent), latex (natural rubber) and so forth. Among these materials, polyolefin is particularly preferable from the viewpoint of heat welding ability to the oxygen scavenger. The shape of the liner is not particularly restricted. Various shapes can be applied in accordance with the shape of the closure or the container as long as sealability and cap-opening property are satisfied.

The respective parts of the oxygen scavenger according to the present invention have been described. In the present invention, other members may be further provided to the oxygen scavenger. For example, a member which does not damage the oxygen permeability of the oxygen scavenger such as a net, a woven fabric, a non-woven fabric, a porous sheet or a sponge may be provided on the oxygen permeable film. If such is the case, the covering member can appropriately protect the oxygen permeable film while maintaining the high oxygen absorption ability of the oxygen scavenger.

The oxygen scavenger according to the present invention is effective to preserve the beverages, foods or chemicals which are liable to be changed in quality or deteriorated by the oxygen present in the container. The oxygen scavenger is suitable to preservation of beverages, liquids, fluid foods and foods containing water, for example, fresh juice such as tomato juice, alcohol such as beer, sake, wine and whisky, seasonings such as soy sauce, mirin (Japanese seasoning), sauce, salad oil, and ketchup and miso, fresh foods such as spawn (aquatic animal eggs) and various sea foods. The oxygen scavenger can absorb the oxygen present in the container or/and in the contained substances themselves by bringing the oxygen scavenger directly into contact with these substances or disposing the oxygen scavenger at a position separated from the substances with a certain distance. The substances can be prevented from being changed in quality or deteriorated and maintained fresh for a long term. Further, the oxygen scavenger according to the present invention can be used for preservation of various substances other than the above-described substances. For example, the oxygen scavenger is effective to rust prevention for metals, preservation or insect proofing for clothing, or deoxygenation for other substances, contained in a container or box.

EXAMPLES

The present invention will be explained in more detail by the examples with reference to the drawings.

The gas (oxygen or nitrogen) permeation rate of the oxygen permeable film was determined by precision membrane flow meter SF-101 (produced by Standard Technology Corporation) under a condition where the primary pressure was controlled to 2 kg/cm$^2$ and the secondary pressure was controlled to 1 kg/cm$^2$, respectively. The oxygen permeation rate "$Q_{O2}$" was determined by using a unit (m$^3$/m$^2$·hr·atm), and this was used as an index of the gas permeability of the oxygen permeable film. The ratio of oxygen/nitrogen permeation rates "$\alpha$" of the oxygen permeable film was calculated by "$Q_{O2}/Q_{N2}$", and this was used as a standard for estimating the homogeneity of the oxygen permeable non-porous layer included in the oxygen permeable film. The specific ratio of oxygen/nitrogen permeation rates "$\alpha$" ($=P_{O2}/P_{N2}$) of the material forming the oxygen permeable non-porous layer and the oxygen permeation rate thereof "$P_{o2}$" were determined by using gas permeation rate measuring apparatus produced by Yanagimoto Seisakusho Corporation at a temperature of 25° C.) and using a dense film of polymer.

EXAMPLE 1

An oxygen permeable film (A) was prepared as follows.

Dimethylformamide solution containing 15 wt % polysulfone (Udel-P3500; produced by Union Carbide Corporation) was cast onto a polyester non-woven fabric (MF110; produced by Nippon Vilene Corporation, thickness: 50 μm, weight: 100 g/m$^2$) at a room temperature. The polysulfone was coagulated by dipping the cast solution in a coagulation bath filled with water. As a result, a membrane (I) having a total thickness of 200 μm and consisting of polysulfone asymmetric porous layer (porosity: 75%) and polyester non-woven fabric layer (thickness: 130 μm) was obtained. Thereafter, trichlorotrifluoroethane solution containing 0.2 wt% silanol terminated polydimethylsiloxane and 0.1 wt % tetraxy(2-propanoneoxime)silane was coated on the membrane (I) only the surface of which had been dewatered. After the coated membrane (I) was heated and dried at a temperature of 130° C. for ten seconds, it was further dried at a temperature of 100° C. for ten minutes. As a result, an oxygen permeable film (A) having a lamination structure of crosslinked siloxane non-porous layer (thickness: about 0.1 μm)/polysulfone asymmetric porous layer/polyester non-woven fabric layer was obtained. The oxygen permeation rate "$Q_{O2}$" of this oxygen permeable film (A) was 6 (m$^3$/m$^2$·hr·atm), the ratio of oxygen/nitrogen permeation rates "$\alpha$" ($=Q_{O2}/Q_{N2}$) thereof was 2.0, and the water vapor permeation rate thereof was 15 (m$^3$/m$^2$·hr·atm). The specific ratio of oxygen/nitrogen permeation rates "$\alpha$" of crosslinked siloxane forming the non-porous layer was 2.0. The oxygen permeability coefficient "$P_{o2}$" thereof was $5\times10^{-8}$ (cm$^3$·cm/cm$^2$·sec·cmHg). From these data, it was recognized that a homogeneous non-porous layer without defects was formed.

An iron-based oxygen absorbent was used as an oxygen absorbent for oxygen scavenger. The iron-based oxygen absorbent (Ageless FX-type produced by Mitsubishi Gas Chemical Company, Inc., content: 2.5 g) and a self-curing type RTV silicone (KE44; produced by Shinetsu Chemical Corporation) of 2.0 g were added to cyclohexane in a nitrogen atmosphere, and these were sufficiently blended. Thereafter, the mixture was applied onto the surface of the polyester non woven fabric of the oxygen permeable film (A) at a rate of 0.07 g per 1 cm$^2$ and then dried. Thus, an oxygen absorbent composition layer was formed. On this oxygen absorbent composition layer, a sheet having a lamination structure of stretched polypropylene/Eval/polyethylene (the respective thicknesses: 20/17/60 μm) was provided to form a back side laminate layer and fixed by heat pressing at a temperature of 140° C. for ten minutes.

The sheet thus obtained had a lamination structure as shown in FIG. 1. The sheet 1 has, from the inner side of a container, an oxygen permeable non-porous layer 2, an asymmetric porous membrane layer 3 consisting of a dense skin layer 4 and a porous layer 5, a support layer 6 consisting of polyester non-woven fabric, an oxygen absorbent composition layer 7 containing an oxygen absorbent in a resin, and a back side laminate layer 8.

In this example, the oxygen permeable non-porous layer 2, the asymmetric porous membrane layer 3 and the support layer 6 form an oxygen permeable film 9. Further, the back side laminate 8 has a gas barrier property as well as an adhesive property. Therefore, for example, in a case where an oxygen scavenger formed from the above sheet 1 is attached to the inner surface of a plastic container whose wall does not have a sufficient gas barrier property, the back side laminate 8 can function to prevent the permeation of oxygen through the container wall.

Figure 2:
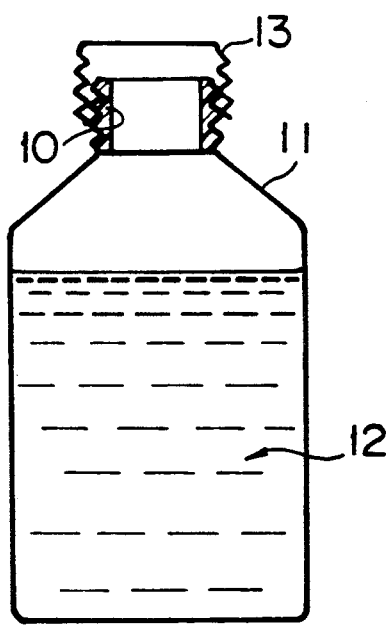
FIG. 2 is a vertical sectional view of a bottle provided with an oxygen scavenger and containing a beverage, showing a method for using the oxygen scavenger according to the present invention.

The sheet 1 obtained was cut to an appropriate size to form an oxygen scavenger 10 and the oxygen scavenger was fixed to the inner surface of a plastic bottle 11 (capacity: 500 ml) at a position of the bottle neck (in the headspace) as shown in FIG. 2. An orange juice 12 was charged into the bottle 11 and the bottle was sealed by a cap 13. Where, a property required to an attached oxygen scavenger was supposed to be able to reduce the initial oxygen concentration 20% in the bottle to a value lower than 0.5% three days after, and to maintain the reduced oxygen concentration lower than 1.0% until at least three months after. As the result of estimating the above oxygen scavenger, this supposed required property could be completely accomplished. The orange juice could be maintained sufficiently fresh and the taste thereof was not reduced at all even after three months.

EXAMPLE 2

Ageless S-type (content: 2.5 g) produced by Mitsubishi Gas Chemical Company, Inc. was used as an iron-based oxygen absorbent. Other conditions and the estimation manner were the same as those of Example 1.

The supposed required property could be also completely accomplished, the orange juice could be maintained sufficiently fresh and the taste thereof was not reduced at all even after three months.

EXAMPLE 3

A membrane (I) (having a lamination structure of polysulfone asymmetric porous layer/polyester non-woven fabric layer) in Example 1 was used as an oxygen permeable film. Other conditions and the estimation manner were the same as those of Example 1. The supposed required property could be also completely accomplished, the orange juice could be maintained sufficiently fresh and the taste thereof was not reduced at all even after three months.

COMPARATIVE EXAMPLE 1

The oxygen scavenger obtained in Example 1 was not used. The estimation method using the orange juice and the plastic bottle was the same as that of Example 1. As the result of the estimation, although the oxygen concentration in the headspace of the bottle was slightly reduced because a part of the oxygen present in the headspace was absorbed into the contained juice, the oxygen concentration remained higher than 5.0% even after three months. As a result, the freshness and the taste of the juice were both reduced.

EXAMPLE 4

Dimethylformamide solution containing 15 wt% polysulfone (Udel-P3500; produced by Union Carbide Corporation) was cast onto a polyester non-woven fabric (MF110; produced by Nippon Vilene Corporation, thickness: 50 μm, weight: 100 g/m²) at a room temperature. The polysulfone was coagulated by dipping the cast solution in a coagulation bath filled with water. As a result, a membrane (II) having a total thickness of 160 μm and consisting of polysulfone asymmetric porous layer (porosity: 75%) and polyester non-woven fabric layer (thickness: 130 μm) was obtained.

A 2 wt % polymer solution was prepared by dissolving amino-modified polydimethylsiloxane having the following chemical formula into trichlorotrifluoroethane.

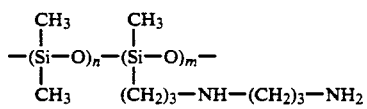

Where, $m/(m+n) = 0.026$, and $m+n$ (number-average molecular weight) $= 1,600$.

On the other hand, trichlorotrifluoroethane solution containing 1 wt% tolylenediisocyanate/dibutyl-tin-diacetate (weight ratio: 9/1) was prepared After these two solution were mixed at a ratio of 1:1, the mixed solution was further diluted by trichlorotrifluoroethane. The diluted solution was coated on the membrane (II) only the surface of which had been dewatered. After the coated membrane (II) was heated and dried at a temperature of 130° C. for one minute, it was further dried at a room temperature for one hour. As a result, an oxygen permeable film (B) having a lamination structure of crosslinked siloxane non-porous layer (thickness: about 0.08 μm)/polysulfone asymmetric porous layer/polyester non-woven fabric layer was obtained. The oxygen permeation rate "$Q_{O2}$" of this oxygen permeable film (B) was 10 (m³/m²·hr·atm), the ratio of oxygen/nitrogen permeation rates "$\alpha$" ($=Q_{O2}/Q_{N2}$) thereof was 2.1, and the water vapor permeation rate thereof was 21 (m³/m²·hr·atm). The specific ratio of oxygen/nitrogen permeation rates "$\alpha^*$" of crosslinked siloxane forming the non-porous layer was 2.1. The oxygen permeability coefficient "$P_{O2}$" thereof was $6 \times 10^{-8}$ (cm³·cm/cm²·sec·cmHg). From these data, it was recognized that a homogeneous non-porous layer without defects was formed.

The oxygen permeable film (B) was used for forming an oxygen scavenger in this Example. Other conditions and the estimation manner were the same as those of Example 1. The supposed required property aforementioned could be also completely accomplished, the orange juice could be maintained sufficiently fresh and the taste thereof was not reduced at all even after three months.

EXAMPLE 5

Trimethoxyvinylsilane of 50g was added to a solution made by heat dissolving poly(4-methylpentene-1) (TPX-001 (trademark); produced by Mitsui Petroleum Chemical Industries, Inc.) of 25 g into xylene anhydride of 250 g in a nitrogen atmosphere. After benzoyl peroxide of 1.25 g was added to the solution prepared, the solution was reacted at a temperature of 110° C. for about four hours. After the polymer obtained by the reaction was purified from methanol by performing reprecipitation two times, vacuum drying was performed. As a result, methoxysilane graft poly(4-methylpentene-1) was obtained. The content of silica of this graft polymer was 0.13%. The methoxysilane graft poly(4-methylpentene-1) of 1 g and dilauric acid di-n-butyl tin of 10mg were dissolved into cyclohexane of 200 g. This solution was coated on the membrane (II) prepared in Example 3. After the coated membrane (II) was heated and dried at a temperature of 140° C. for five minutes, it was further dried at a room temperature for one hour. As a result, an oxygen permeable film (C) having a lamination structure of crosslinked poly(4-methylpentene-1) non-porous layer (thickness: about 0.1 μm)/polysulfone asymmetric porous layer/polyester non-woven fabric layer was obtained. The oxygen permeation rate "$Q_{O2}$" of this oxygen permeable film (C) was 0.2 (m³/m²·hr·atm), the ratio of oxygen/nitrogen permeation rates "$\alpha$" ($=Q_{O2}/Q_{N2}$) thereof was 3.8, and the water vapor permeation rate thereof was 5 (m³/m²·hr·atm). The specific ratio of oxygen/nitrogen permeation rates "$\alpha^*$" of crosslinked poly(4-methylpentene-1) forming the non-porous layer was 4.2. The oxygen permeability coefficient "$P_{O2}$" thereof was $1.5 \times 10^{-9}$ (cm³·cm/cm·sec·cmHg). From these data, it was recognized that a homogeneous non-porous layer without defects was formed.

The oxygen permeable film (C) was used for forming an oxygen scavenger in this Example. Other conditions and the estimation manner were the same as those of Example 1. The supposed required property aforementioned could be also completely accomplished, the orange juice could be maintained sufficiently fresh and the taste thereof was not reduced at all even after three months.

EXAMPLE 6

Figure 3:
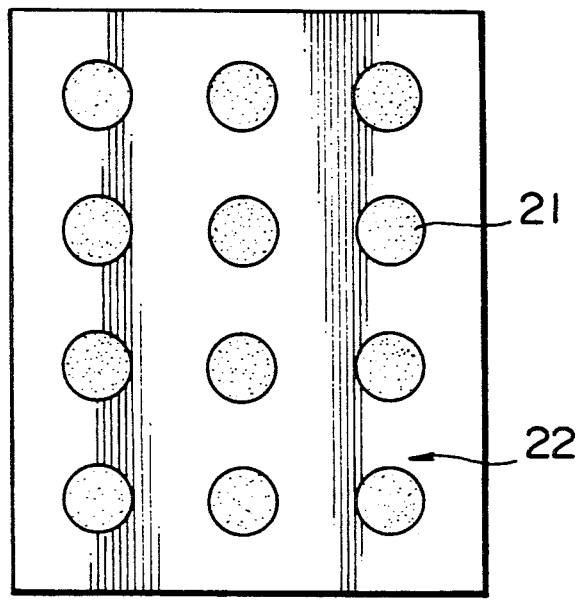
FIG. 3 is a plan view of a sheet applied with a solution for making an oxygen scavenger according to another embodiment of the present invention.
Figure 4:
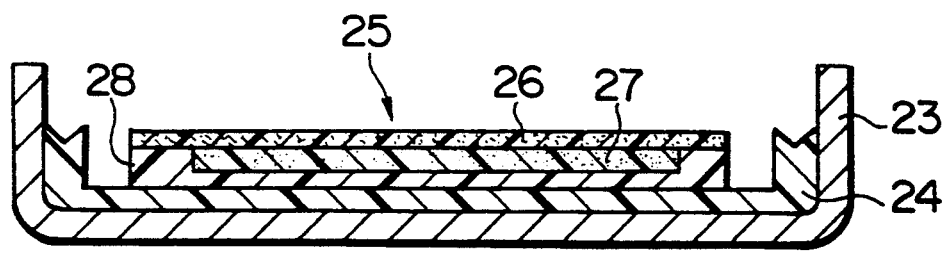
FIG. 4 is a vertical sectional view of a crown provided with an oxygen scavenger made from the sheet shown in FIG. 3.

In this Example, oxygen absorbable discs for a crown were produced. The iron-based oxygen absorbent (Ageless FX-type produced by Mitsubishi Gas Chemical Company, Inc., content: 2.5 g) and a self-curing type RTV silicone (KE44; produced by Shinetsu Chemical Corporation) of 2.0 g were added to cyclohexane in a nitrogen atmosphere, and these were sufficiently blended. Thereafter, as shown in FIG. 3, the mixture was applied onto the surface of the polyester non-woven fabric of the oxygen permeable film (A) obtained in Example 1 (22 in FIG. 3) so as to form "polka dots" 21 at a weight of 0.09 g and a diameter of 13 mm per one disc, and then dried. On this sheet, polyethylene sheet having a thickness of 300 μm (produced by Mitsubishi Yuka Corporation) was fixed as a back side laminate by heat pressing at a temperature of 140° C. for ten minutes. The lamination sheet obtained was cut to circles each having a diameter of 15 mm with the same center as that of each of the "polka dots". The circular disc obtained was fixed to the back side surface of a crown having a polyethylene liner by ultrasonic welding so that the back side laminate adhered to the polyethylene liner. As a result, as shown in FIG. 4, a crown 23 having a polyethylene liner 24, to which an oxygen absorbable disc 25 (oxygen scavenger) was attached on the back side of the crown, was obtained. The oxygen absorbable disc 25 has a lamination structure consisting of an oxygen permeable film 26, an oxygen absorbent composition 27 and a back side laminate 28. The oxygen permeable film 26 and the oxygen absorbent composition 27 have substantially the same structures as those of the oxygen scavenger of Example 1.

A crown of a commercial beer (the bottle capacity: 633 ml) was opened, and then the headspace of the bottle was purged by foaming beer, and then 1 cc of the air was injected into the headspace for equalizing to normal beer, and thereafter, the above crown with the oxygen absorbable disc 25 was immediately attached to seal the bottle. The oxygen concentrations in the headspace of the bottle and in the beer itself were measured by a measuring apparatus (Orbisphere laboratories, model 2740) at the times when the original crown was opened and when six days expired after the oxygen absorbable disc 25 was attached. As a result, the initial oxygen concentration of the headspace "5,200 ppm (cc O$_2$/cc headspace)" was reduced to 402 ppm, and the initial oxygen concentration in the beer "200 ppb (g O$_2$/g beer)" was reduced to 9 ppb, respectively. The taste and flavor of the beer was not reduced.

EXAMPLE 7

Ageless S-type (content: 2.5 g) produced by Mitsubishi Gas Chemical Company, Inc. was used as an iron-based oxygen absorbent. Other conditions and the estimation manner were the same as those of Example 6. As a result, the initial oxygen concentration of the headspace "5,100 ppm" was reduced to 435 ppm, and the initial oxygen concentration in the beer "192 ppb" reduced to 10 ppb, respectively. The taste and flavor of the beer was not reduced.

COMPARATIVE EXAMPLE 2

The oxygen absorbable disc 25 obtained in Example 6 was not used. The estimation manner was the same as that of Example 6. As a result, the initial oxygen concentration of the headspace "5,200 ppm" was reduced only to 2,365 ppm. This reduction of the oxygen concentration is supposed to the result that a part of the oxygen present in the headspace was absorbed by the beer. Since the reduction of the oxygen concentration was small, the taste and flavor of the beer was reduced.

EXAMPLE 8

The oxygen permeable film (B) obtained in Example 4 was used for forming an oxygen absorbable disc in this Example. Other conditions and the estimation manner were the same as those of Example 6. As a result, the initial oxygen concentration of the headspace "5,040 ppm" was reduced to 720 ppm, and the initial oxygen concentration in the beer "205 ppb" reduced to 10 ppb, respectively. The taste and flavor of the beer was not reduced.

EXAMPLE 9

The oxygen permeable film (C) obtained in Example 5 was used for forming an oxygen absorbable disc in this Example. Other conditions and the estimation manner were the same as those of Example 6. As a result, the initial oxygen concentration of the headspace "5,120 ppm" was reduced to 710 ppm, and the initial oxygen concentration in the beer "210 ppb" reduced to 10 ppb, respectively. The taste and flavor of the beer was not reduced.

EXAMPLE 10

The oxygen absorbable disc 25 made in Example 6 was used for a commercial orange juice (bottle capacity: 500 ml). After an original crown was opened, the crown shown in FIG. 4 was attached and the bottle was thereby sealed. The estimation manner was the same as that of Example 1. The required property supposed in Example 1 could be completely accomplished, the orange juice could be maintained sufficiently fresh and the taste thereof was not reduced at all even after three months.

Although several preferred embodiments of the present invention have been described herein in detail, it will be appreciated by those skilled in the art that various modifications and alterations can be made to these embodiments without materially departing from the novel teachings and advantages of this invention. Accordingly, it is to be understood that all such modifications and alterations are included within the scope of the invention as defined by the following claims.

What is claimed is:

1. An oxygen scavenger comprising:
   an oxygen absorbent composition including an oxygen absorbent and a resin containing said oxygen absorbent therein said resin being substantially impermeable to moisture under normal atmospheric conditions but permeable to moisture and oxygen under a high-moisture condition; and
   an oxygen permeable film covering said oxygen absorbent composition and involving a polymeric asymmetric porous membrane whose outer surface portion in the thickness direction of said asymmetric porous membrane is formed as a dense skin layer, said dense skin layer having a thickness in the range of 0.01 to 1 μm and having pores with a pore size of 0.0005 to 0.5 μm, said pores being smaller than pores of the remaining portion of said asymmetric porous membrane.

2. The oxygen scavenger according to claim 1, wherein said resin is a silicone resin.

3. The oxygen scavenger according to claim 1, wherein said oxygen permeable film has a support layer a member of constructed from a woven or a non-woven fabric on the surface of said asymmetric porous membrane opposite to the surface formed by said dense skin layer for supporting said asymmetric porous membrane.

4. The oxygen scavenger according to claim 1, wherein said oxygen permeable film further has an oxygen permeable non-porous layer on said dense skin layer.

5. The oxygen scavenger according to claim 4, wherein the ratio of oxygen/nitrogen permeation rates of said oxygen permeable film is in the range of 0.5–2.0 times of the specific ratio of oxygen/nitrogen permeation rates of a material constituting said oxygen permeable non-porous layer.

6. The oxygen scavenger according to claim 4, wherein the oxygen permeation rate of said oxygen permeable film is in the range of 0.1–15 $m^3/m^2 \cdot hr \cdot atm$.

7. The oxygen scavenger according to claim 4, wherein the thickness of said oxygen permeable non-porous layer is in the range of 0.01–3 $\mu m$.

8. The oxygen scavenger according to claim 4, wherein said oxygen permeable non-porous layer is constructed from polyorganosiloxane.

9. The oxygen scavenger according to claim 1, wherein said oxygen absorbent is an iron-based absorbent.

10. The oxygen scavenger according to claim 1, wherein said oxygen scavenger is attached to the inner surface of a sealable container or a closure.

11. The oxygen scavenger according to claim 10 further comprising a back side laminate provided between said oxygen absorbent composition and the inner surface of said sealable container or closure.

12. The oxygen scavenger defined in claim 1 wherein said oxygen absorbent composition is selected from a member of the group consisting of ascorbic acid, ascorbic acid salt, isoascorbic acid, isoascorbic acid salt, gallic acid, gallic acid salt, tocopherol, hydroquinone, catechol, resorcine, dibutylhydroxyltoluene, dibutylhydroxyanisole, pyrogallol, sorbose, glucose and lignine, iron powder, activated iron, ferrous oxide and iron salt, sulfite, thiosulfate, dithionite and hydrogensulfite, oxidation-reduction resin and polymer metallic complex, zeolite and activated carbon.

13. An oxygen scavenger container cover comprising:

a cap having a shape adapted to closely fit an opening of a container;

an oxygen absorbing composition positioned interiorly of said cap said oxygen absorbing composition including an oxygen absorbent and resin containing said oxygen absorbent therein, said resin being substantially impermeable to moisture under normal atmospheric conditions but permeable to moisture and oxygen under a high-moisture condition; and an oxygen permeable, liquid impermeable film covering said oxygen absorbing composition, said oxygen permeable, liquid impermeable film including a polymeric asymmetric porous membrane whose outer surface portion in the thickness direction of said asymmetric porous membrane is formed as a dense skin layer, said dense skin layer having a thickness in the range of 0.01 to 1 $\mu m$ and having pores with a pore size of 0.0005 to 0.5 $\mu m$, said pores being smaller than pores of the remaining portion of said asymmetric pores membrane.

14. The oxygen scavenger container cover as defined in claim 13 wherein said oxygen absorbent composition is selected from a member of the group consisting of ascorbic acid, ascorbic acid salt, isoascorbic acid, isoascorbic acid salt, gallic acid, gallic acid salt, tocopherol, hydroquinone, catechol, resorcine, dibutylhydroxyltoluene, dibutylhydroxyanisole, pyrogallol, sorbose, glucose and lignine, iron powder, activated iron, ferrous oxide and iron salt, sulfite, thiosulfate, dithionite and hydrogensulfite, oxidation-reduction resin and polymer metallic complex, zeolite and activated carbon.

15. The oxygen scavenger container cover as defined in claim 17 wherein the asymmetric porous membrane has a porosity in the range of 10–90%.

16. The oxygen scavenger container cover as defined in claim 13 wherein the asymmetric porous membrane has a porosity in the range of 70–85%.

17. The oxygen scavenger container cover as defined in claim 13 wherein said oxygen absorbent composition comprises an oxygen absorbent and a resin containing said oxygen absorbent thereon.

18. The oxygen scavenger container cover as defined in claim 17 wherein said resin is selected from the group consisting of polyethylene, polypropylene, ethylene-vinyl acetate copolymer, vinyl chloride-based copolymer, isoprene-based copolymer, butadiene-based copolymer, chloroprene-based copolymer, urethane-based copolymer and acryl-based copolymer.

19. The oxygen scavenger container cover as defined in claim 13 wherein the asymmetric porous membrane is formed from material selected from the group consisting of polysulfone, polyethersulfone, polyphenylenesulfidesulfone, polyphenylenesulfone, cellulose acetate, ethyl cellulose and cellulose, polyacrylonitrile, polypropylene and polyethylene, polyvinylidene fluoride and polytetrafluoroethylene, polyamide-based materials, polyimide-based materials and polyurethane-based materials.

* * * * *

UNITED STATES PATENT AND TRADEMARK OFFICE
CERTIFICATE OF CORRECTION

PATENT NO.  : 5,143,763
DATED       : September 1, 1992
INVENTOR(S) : Shinichi Yamada et al It is certified that error appears in the above-identified patent and that said Letters Patent is hereby corrected as shown below:

In Column 16, line 4, please change ""$\alpha$"" to --"$\alpha^*$"--.

In Column 20, line 54, please change "involving" to --including--.

In Column 22, line 26, please change "17" to --13--.

Signed and Sealed this

Twenty-fourth Day of August, 1993

Attest:

BRUCE LEHMAN

*Attesting Officer*     *Commissioner of Patents and Trademarks*